Figure 1:
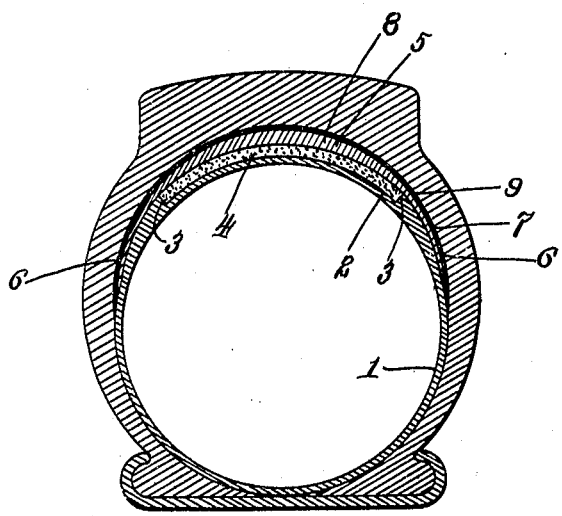

Sept. 4, 1928.

W. FETTER 1,683,454

SELF HEALING INNER TUBE

Filed Oct. 13, 1924

WITNESSES
Porter H. Faulk
E. Wehmeyer

Inventor
William Fetter
By Edwin Edmunds
Attorney

Patented Sept. 4, 1928.

1,683,454

UNITED STATES PATENT OFFICE.

WILLIAM FETTER, OF BALTIMORE, MARYLAND.

SELF-HEALING INNER TUBE.

Application filed October 13, 1924. Serial No. 743,244.

The invention relates to inner tubes of the general type which have the tread or the tread and other portions of the tube formed with a double wall providing a pocket which contains a plastic self-healing composition which in the case of a puncture enters the aperture, forming a plug, or otherwise closes the aperture, preventing the escape of the air from the tube and deflation of the tire.
In the manufacture of such tubes, a considerable degree of difficulty has been encountered in placing the self-healing compound and confining it to the desired area intended to form the pocket, the spread of this material tending to prevent proper adhesion of the rubber where it is joined to form the pocket, and it has further been found that the presence of the self-healing compound during vulcanization interferes with the curing of the rubber.

The present invention relates to the production of a tube with a pocket for self-healing compound which may be vulcanized prior to the introduction of the compound, the pocket being so formed and arranged as to confine the compound when introduced to the desired area of the tube wall to be thus treated.

The invention also relates to the method of making a self-healing tube having the characteristics above outlined.

In the practice of my method I first produce the desired length of tubing of unvulcanized rubber having a portion of the area usually comprising the tread and as much of the side walls as it is considered desirable to treat in this way, bounded by or lying between two longitudinal shoulders, which when the tube is laid flat with this portion upwards, may be described as forming a shallow groove or channel. The tubing thus formed of unvulcanized or raw rubber is then vulcanized, and after vulcanization either before or after splicing at the ends, the tube is laid flat with the groove referred to upward, and the groove is filled with self-healing compound and covered by means of a cover strip preferably of rubber which extends about the circumference of the tube on the outside and which should be reduced in thickness at the edges so as to produce a smooth exterior surface of the tube. These edges overlap the groove to a considerable extent on both sides and are secured to the side walls of the tube in any suitable manner, as by means of a vulcanizing cement which is cured by heat treatment.

This cover strip may be formed of rubber, thickest at the centre and tapered at both edges, and may to advantage be made with the outer surface flat or otherwise shorter than the inside surface, and covered by means of a comparatively inelastic fabric which is placed in the mold with the strip when the latter is vulcanized, and which when the strip is applied outside of the tube, on account of the longer arc of the fabric as compared to the arc of the inside of the strip, tends to compress laterally the rubber forming the strip and the outside of the pocket, giving an additional protection against punctures on account of this lateral compression.

In the accompanying drawing I have illustrated a tube constructed in accordance with my invention,—

Figure 1 being a transverse cross-section of the completed tube.

Figure 2:
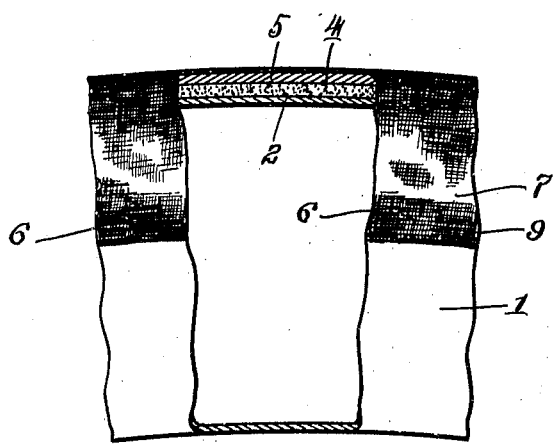

Figure 2 a side elevation, partly in section.

Figure 3:
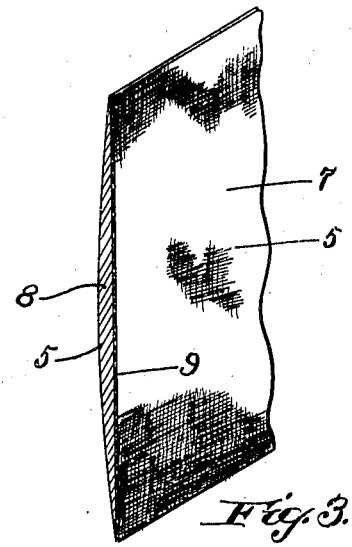

Figure 3 a transverse section through the cover strip, before it is applied to the tube, showing a portion thereof in perspective.

Referring to the drawings by numerals, each of which is used to indicate the same or similar parts in the different figures, the self-healing tube consists of a tubular member 1 formed of vulcanized rubber and having in its outer circumferential surface a groove 2 which may be of any desired width and which is formed between shoulders 3 which extend longitudinally or circumferentially about the tube in the direction of its long circumference, puncture healing material 4 in the groove and cover strip 5.

The groove 2 is filled or partially filled with puncture-healing plastic 4 of any suitable composition and closed by means of a cover strip 5 of rubber covering the groove and having side edge portions 6 extending beyond the groove on each side and secured to the side walls of the tube in any suitable manner, preferably by cementing by means of a heat-treated or vulcanizing cement.

This cover strip 5 may be formed with its outer surface 7 flat or otherwise of less area than the inner surface 8 which is convex, and this outer surface 7 is covered with comparatively inelastic fabric 9 which is secured to the surface preferably by vulcanization, the fabric being placed in the mold when the strip is formed. The formation and placing of the cover strip in this way causes the convex surface 8 to be bent inwardly on the arc of the tread surface of the tire when the tire and tube are inflated, the inelastic member serving to compress the rubber forming the cover strip and increasing the puncture-closing effect of the entire structure by providing an excess of elastic rubber to fill the openings thus formed.

I have thus described specifically and in detail a single embodiment of my invention together with the method of manufacture which is also a feature of my invention, the description being specific and in full detail in order that the nature and operation of the invention may be fully understood; however, the specific terms herein are used descriptively rather than in a limiting sense, the scope of the invention being defined in the claims.

What I claim and desire to secure by Letters Patent is:

1. In an inner tube for pneumatic tires, a tubular member of vulcanized rubber having a channel extending longitudinally of the tread portion, puncture-healing plastic in the channel, and a cover strip covering the channel and secured to the tube at each side of the channel.

2. An inner tube for pneumatic tires having longitudinally extending shoulders spaced apart to form a channel including the tread portion of the tube, puncture-healing material in the channel and a cover strip holding the puncture-healing material in the channel and secured to the tubular member at each side of the channel.

3. An inner tube for pneumatic tires having longitudinally extending shoulders spaced apart to form a channel, puncture-healing material in the channel and a cover strip holding the puncture-healing material in the channel and secured to the tubular member at each side of the channel, the cover strip being composed of rubber and having a fabric covering on the outside whereby the rubber is placed under compression laterally when the tube is inflated in the casing.

4. An inner tube for pneumatic tires having longitudinally extending shoulders spaced apart to form a channel, puncture-healing material in the channel and a cover strip holding the puncture-healing material in the channel and secured to the tubular member at each side of the channel, the cover strip being composed of resilient material and having an outer covering of fabric, the inside of the cover strip being convex when the strip is flat, so that the bending of the cover strip when the tube is inflated places the resilient material under lateral compression.

Signed by me at Baltimore, Maryland, this 8th day of October, 1924.

WILLIAM FETTER.